United States Patent [19]
Schwartzkopf

[11] 3,944,196
[45] Mar. 16, 1976

[54] RECOIL SPRING HOUSING ASSEMBLY

[75] Inventor: Glen E. Schwartzkopf, Aurora, Ill.

[73] Assignee: Caterpillar Tractor Co., Peoria, Ill.

[22] Filed: May 24, 1974

[21] Appl. No.: 473,138

[52] U.S. Cl. ............. 267/4; 267/168; 105/199 CB; 105/197 D
[51] Int. Cl.² ......................................... F16F 1/06
[58] Field of Search .......... 267/4 R, 9 B, 61 R, 168, 267/9 C; 105/199 CB, 197 D, 197 R

[56] References Cited
UNITED STATES PATENTS

| 1,093,642 | 4/1914 | Mahlfeld | 267/9 C |
|---|---|---|---|
| 1,905,252 | 4/1933 | Symington | 267/4 |
| 1,931,183 | 10/1933 | Drenning | 267/4 |
| 2,358,510 | 9/1944 | Holland et al. | 267/4 |
| 3,286,653 | 9/1966 | Weber | 105/197 D |
| 3,601,063 | 8/1971 | Dean | 267/4 |
| 3,795,201 | 3/1974 | Tack | 105/199 CB |

*Primary Examiner*—James B. Marbert
*Attorney, Agent, or Firm*—Phillips, Moore, Weissenberger Lempio & Strabala

[57] ABSTRACT

A recoil assembly for track type vehicle includes a housing having a preloaded spring assembly mounted therein. The housing is an open sided housing having a pair of ends with aligned apertures formed therein. The spring assembly includes a pair of spaced apart seat members confining a pair of compression springs therebetween with adjustable means in between the seat members for compressing the spring. One of the seat members includes a projection extending into the aperture at one end of the housing and the other seat includes means receiving the extension of a bushing extending through the other aperture. This bushing and aperture arrangement retains the spring assembly within the housing. The open side of the housing is provided with a fixed bar and a removable bar for removably confining the spring within the housing in a functional position.

6 Claims, 4 Drawing Figures

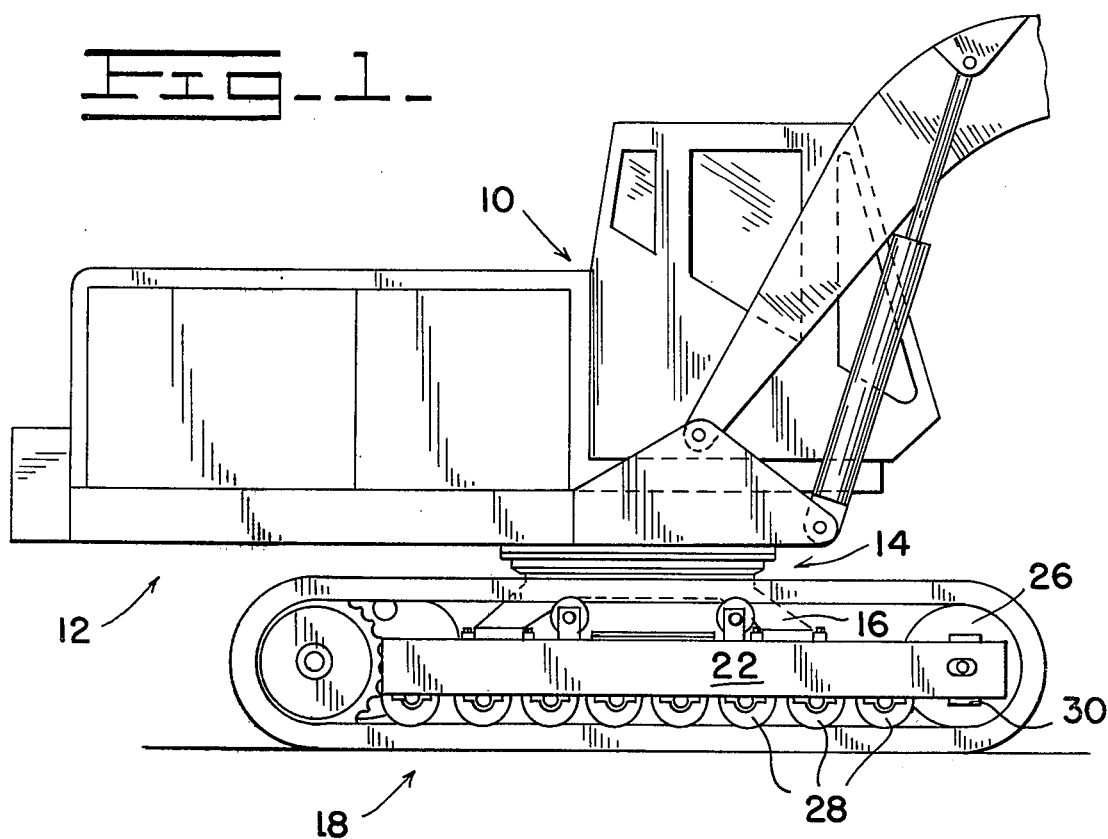
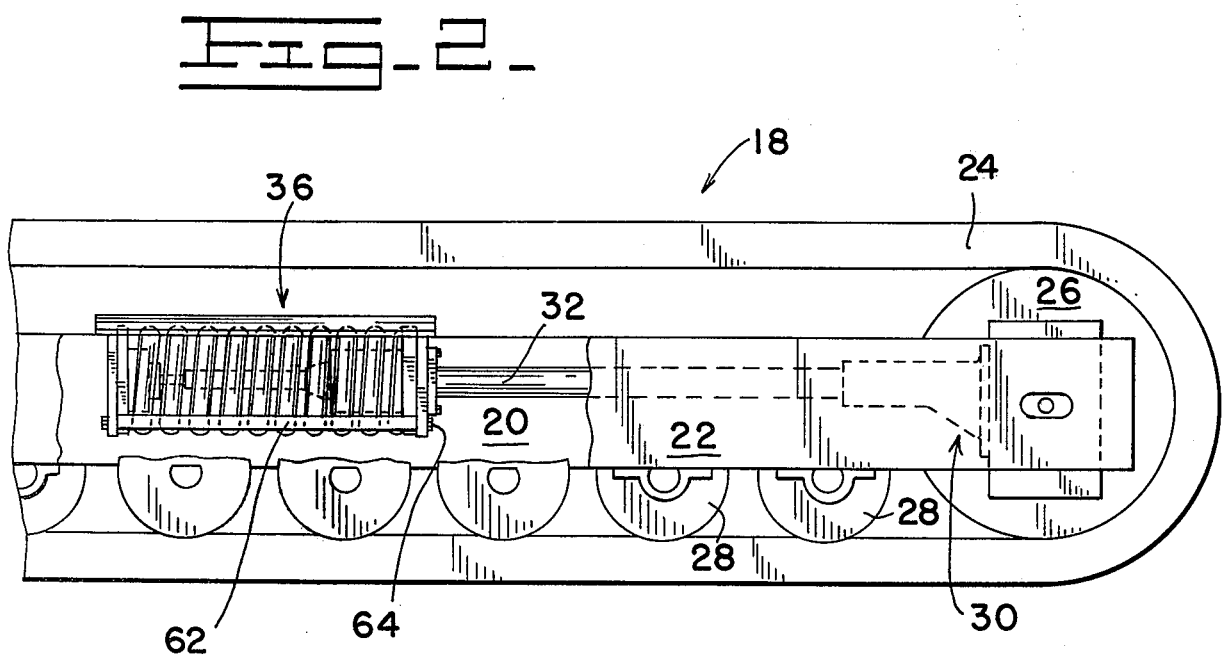

RECOIL SPRING HOUSING ASSEMBLY

BACKGROUND OF THE INVENTION

Track type tractors require recoil mechanisms for maintaining the track in a taut position yet providing sufficient resilience to recoil under heavy shock loads. Such recoil mechanisms must oftentimes be replaced in the field and thus must be capable of being handled by field tools.

With larger machines, the recoil mechanism utilizes extremely large heavy springs which can become very dangerous to handle. For this reason, it is desirable that such springs be provided with means for loading the springs to their preloaded condition in the field or means for mounting them in the loaded condition.

Still another problem exists with track undercarriages for excavator-type vehicles. Such tracks are very low in profile and thus do not provide much space for the recoil mechanism. It is therefore desirable that such mechanism be confined to as compact a space as possible.

The prior art is exemplified by the following list of U.S. patent Nos.
RE. 24,126 issued Mar. 6, 1956 to Henderson
No. 2,683,064 issued July 6, 1954 to Land
No. 2,717,813 issued Sept. 13, 1955 to Gardner
No. 2,887,342 issued May 19, 1959 to Helso, Sr.
No. 3,332,725 issued July 25, 1967 to Rhinesma
No. 3,409,335 issued Nov. 5, 1968 to Piepho et al
None of these patents suggests a satisfactory solution to the problem presented herein.

SUMMARY AND OBJECTS OF THE INVENTION

It is the primary object of the present invention to overcome the above problems with the prior art.

Another object of the present invention is to provide a recoil spring assembly that may be readily assembled or mounted on a vehicle in the field.

A further object of the present invention is to provide a recoil mechanism that may be detachably secured to a vehicle in its preloaded condition.

In accordance with the present invention, a recoil mechanism for a track-type tractor includes a housing confining a recoil spring therein in its preloaded condition. The housing is mountable on the rails of a track assembly in its preload condition to receive the pushrod of an idler yoke assembly.

BRIEF DESCRIPTION OF THE DRAWINGS

The above and other objects and advantages of the present invention will become apparent from the following description when read in conjunction with the accompanying drawings wherein:

FIG. 1 is a side elevational view of an excavator machine incorporating the present invention;

FIG. 2 is a detailed view of a portion of the track assembly of the vehicle in FIG. 1 with portions broken away to show details;

DETAILED DESCRIPTION OF PREFERRED EMBODIMENT

Figure 3:
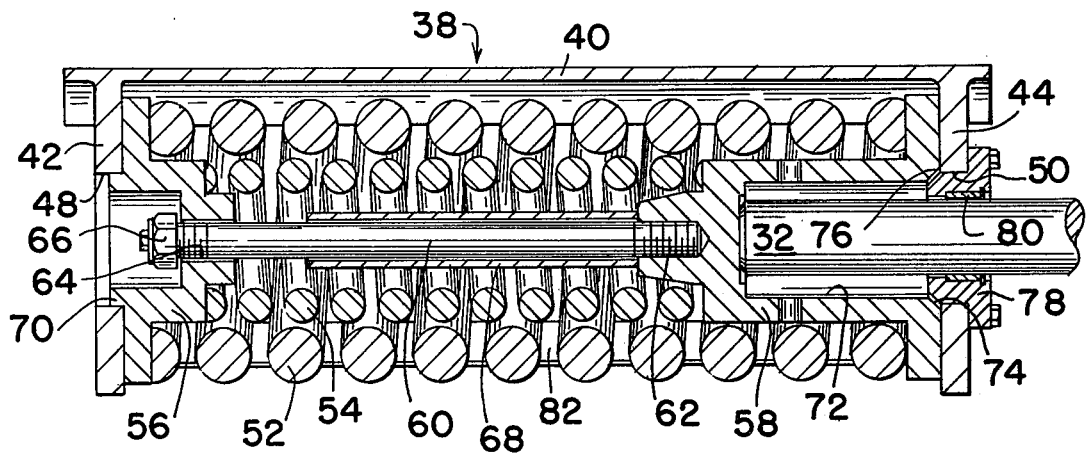
FIG. 3 is a cross sectional view of the recoil assembly of FIG. 2.

Referring particularly to FIG. 1, there is illustrated a hydraulic excavator generally indicated by the numeral 10 which comprises an upper frame assembly 12 containing an engine, a hydraulic system, and an operator station. The upper frame assembly is rotatably supported by means of a swing mechanism 14 to car body frame 16 which in turn is supported on a pair of spaced track assemblies 18. Each track roller assembly comprises a pair of spaced apart rails 20 and 22 for journaling idler wheels and rollers for supporting an endless track 24. The track is trained about an idler sprocket or wheel 24 and is engaged at the lower portion thereof by means of a plurality of rollers 28 each of which is journaled in two suitable bearing assemblies carried by the spaced rails 20 and 22. The idler wheel 26 is journaled in a suitable yoke assembly 30 which includes a pushrod 32 extending to and operatively connected to a recoil mechanism indicated generally at 36.

As will be appreciated from viewing FIG. 1, the recoil mechanism 36 is disposed between the rails 20 and 22 of the track assembly. It will be further appreciated that the construction of the track assembly as shown in FIG. 1 is that of a low profile track so that the upper structure may freely rotate about a vertical axis while maintaining a low profile to improve stability of the machine. Thus, it can be appreciated that a compact arrangement of recoil mechanism is necessary to maintain the low profile of the track assembly.

Figure 4:
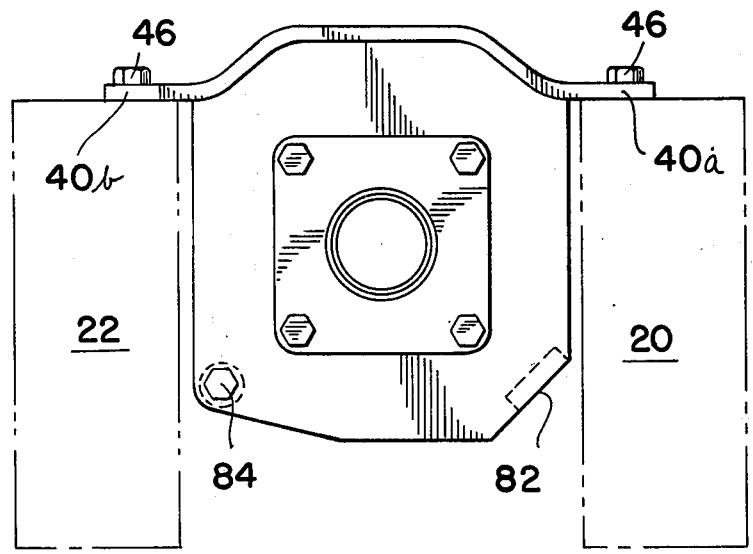
FIG. 4 is a front end view of the recoil housing of FIG. 3.

The track recoil assembly itself, as best seen in FIG. 3, comprises a unitary housing or frame member 38 comprising a side or top wall 40 interconnecting a pair of end walls 42 and 44. The top wall as best seen in FIG. 4 includes a pair of extensions 40a and 40b, extending laterally outward to engage and connect to the spaced side rails 20 and 22 such as by suitable bolts 46. These end walls are a predetermined distance apart to provide preadjusted tension in the springs. The end walls 42 and 44 are provided with apertures or bores 48 and 50 respectively which are coaxially aligned, and cooperate to hook or retain the spring assembly within the housing.

The spring assembly itself comprises, as best seen in FIG. 3, a large compression spring 52 and a somewhat smaller compression spring 54 which is nestled within spring 52. These springs are compressed between a pair of seat members 56 and 58 and the end walls 42 and 44. These members are interconnected by suitable means such as a tie rod 60 connected by threaded engagement at 62 to member 58 and extending through aperture 64 of member 56 and including a nut 66. This arrangement is operative to compress the springs for assembly between end walls 42 and 44 of the housing. Thus, with this construction, the seat members 56 and 58 may be drawn together towards one another by means of the nut 66 threadably engaging rod 60.

A sleeve 68 surrounds rod 60 and serves as stop means and guide means for the arrangement. The stop means is provided when the ends of the sleeve 68 engage the respective seat members. The sleeve may also be provided with sufficient diameter to assist in guiding the inner spring to prevent buckling or bowing thereof.

The seat member 56 includes an axially extending annular projecting portion 70 which extends into bore 48 to maintain the seat position within the end 42 of housing 38.

The seat member 58 is generally cup-shaped and has a central bore 72 for receiving the end of pushrod 32. A bevelled or conical shaped portion at the outer end of the bore 74 is provided within member 58 to receive the end of a similarly cooperating end portion 76 of a bearing sleeve endcap member 78 having a bevelled portion 76 cooperatively engaging portion 74. This cooperative engagement between the sleeve member 78 and the seat member 58 retains the seat member laterally in position within the housing 38. The sleeve member 78 includes a sleeve bearing member 80 operative to support and guide the rod member 32 for sliding engagement into and out of the housing 38.

Thus, it will be appreciated from the assembly in FIG. 3 that the entire assembly can be preassembled and contained within the housing ready for assembly into place between the rails of a vehicle. The assembly is mounted between rails 20 and 22 as best seen in FIG. 4 and projects downward completely between the rails. The housing 38 may be preferably constructed to be open on 3 sides and closed only on top, as shown. Suitable guide means such as a longitudinal strap member 82 and a removable bolt 84 may be provided to extend across the open side to retain and guide the spring member 52 in place in the housing.

I claim:

1. Track recoil mechanism comprising:

an elongated unitary housing having an axis and a pair of spaced apart end walls connected a fixed distance apart along said axis by side wall means including a pair of flanges for securing said housing between a pair of spaced apart horizontally extending parallel side rails;

aligned apertures formed in said end walls along said axis;

spring retainer means detachably mounted in said housing and including a pair of springs mounted therein, said retainer means comprising first and second spaced apart annular spring seat members interconnected by adjustable means for precompressing said springs independent of said end walls for placement between said end walls;

said end walls being spaced a predetermined fixed distance apart for establishing a pretension in said springs when said spring seat members engage and are confined by said end walls;

said first spring seat member including pilot means extending into one of said apertures for retaining said assembly in place;

the second of said seat members having a cupshaped portion opening toward the other of said apertures for receiving an idler rod of a yoke assembly extending through said aperture; and, a sleeve extending through said aperture and engaging said cup portion for retaining same in place in said housing.

2. The recoil mechanism of claim 1 wherein said second seat member includes a beveled portion around the rim of said cup for receiving an extension of said sleeve.

3. The recoil mechanism of claim 2 comprising guide means including a fixed bar and removable bar spaced apart and extending along said axis between said end walls defining an open side of said housing, and for guiding said spring for preventing bowing thereof.

4. The recoil mechanism of claim 3 wherein said housing means is mounted between a pair of parallel disposed horizontally extending side rails.

5. The recoil mechanism of claim 4 wherein said adjusting means includes an elongated rod extending between said seat members; and means threadably engaging one end of said rod biasing one of said seats toward the other of said seats.

6. The recoil mechanism of claim 5 including a sleeve surrounding said rod between said seat members.

* * * * *